United States Patent
Huang et al.

(10) Patent No.: US 11,622,071 B2
(45) Date of Patent: Apr. 4, 2023

(54) FOLLOW-UP SHOOTING METHOD AND DEVICE, MEDIUM AND ELECTRONIC DEVICE

(71) Applicant: Beijing Ambow Shengying Education and Technology Co., Ltd., Beijing (CN)

(72) Inventors: Jin Huang, Beijing (CN); Gang Huang, Beijing (CN); Kesheng Wang, Beijing (CN); Minglu Cao, Beijing (CN); Qiaoling Xu, Beijing (CN)

(73) Assignee: BEIJING AMBOW SHENGYING EDUCATION AND TECENOLOGY CO., LTD., Beijing (CN)

( * ) Notice: Subject to any disclaimer, the term of this patent is extended or adjusted under 35 U.S.C. 154(b) by 0 days.

(21) Appl. No.: 17/522,966

(22) Filed: Nov. 10, 2021

(65) Prior Publication Data

US 2023/0067638 A1    Mar. 2, 2023

(30) Foreign Application Priority Data

Aug. 31, 2021    (CN) .......................... 202111017040.3

(51) Int. Cl.
    *H04N 5/232*   (2006.01)
    *G06T 7/246*   (2017.01)
    *G06T 7/73*    (2017.01)
    *G09B 5/06*    (2006.01)
    *G06V 40/10*   (2022.01)

(52) U.S. Cl.
    CPC ......... *H04N 5/23219* (2013.01); *G06T 7/246* (2017.01); *G06T 7/73* (2017.01); *G06V 40/103* (2022.01); *G06V 40/113* (2022.01); *G09B 5/065* (2013.01); *H04N 5/23203* (2013.01); *H04N 5/23238* (2013.01); *H04N 5/23299* (2018.08); *G06T 2207/30196* (2013.01)

(58) Field of Classification Search
    None
    See application file for complete search history.

(56) References Cited

U.S. PATENT DOCUMENTS

| 9,981,193 | B2  |   | 5/2018  | Adams et al. |
| 2018/0253840 | A1 |   | 9/2018 | Tran |
| 2019/0011908 | A1 | * | 1/2019 | Liu ...................... G06F 3/0482 |
| 2020/0409469 | A1 | * | 12/2020 | Kannan ................. G06F 3/017 |
| 2022/0277484 | A1 | * | 9/2022 | Srivastava .......... G06F 3/04815 |

OTHER PUBLICATIONS

Office Action dated Mar. 15, 2022, in corresponding Taiwanese patent Application No. 110143074, 12 pages.
Office Action dated Jul. 27, 2022, in corresponding Taiwanese patent Application No. 110143074, 9 pages.

* cited by examiner

*Primary Examiner* — Eileen M Adams
(74) *Attorney, Agent, or Firm* — Xsensus LLP

(57) ABSTRACT

A follow-up shooting method and device, a medium and an electronic device are provided. The follow-up shooting method includes: acquiring a video image in a live classroom, wherein the video image comprises at least one object; analyzing the video image to obtain a gesture image for controlling a camera; and determining whether to control the camera to track and shoot an execution object related to the gesture image based on the gesture image.

9 Claims, 7 Drawing Sheets

FOLLOW-UP SHOOTING METHOD AND DEVICE, MEDIUM AND ELECTRONIC DEVICE

CROSS-REFERENCE TO RELATED APPLICATION

This application claims priority from Chinese Application No. 202111017040.3, filed on Aug. 31, 2021, the contents of which are incorporated by reference herein in its entirety.

TECHNICAL FIELD

The present disclosure relates to the field of image processing, and in particular to a follow-up shooting method and device, a medium and an electronic device.

BACKGROUND

With the development of computer technology, Internet-based live teaching has begun to emerge, and a panoramic intelligent blackboard combined with multimedia technology has also emerged with the live teaching. In live teaching. A camera is usually used to realize Internet-based real-time remote teaching. In the live teaching classroom, in order to improve the usability of live teaching and reduce the cost of use, a fixed-position camera is usually used to shoot the stage with fixed camera parameters.

However, when the teacher is moving, such as performing an experiment operation, this mode of fixing camera parameters cannot ensure that the students who are listening to the online class may see the experiment process clearly. In this case, it is usually necessary to set up another cameraman for the class, so as to continuously adjust the camera parameters of the camera, and to track and shoot the teacher. If each live teaching classroom is equipped with a cameraman, the teaching cost of the live teaching classroom will increase.

Therefore, the present disclosure provides a follow-up shooting method to solve one of the above technical problems.

SUMMARY

Some embodiments of the present disclose provide a follow-up shooting method comprising: acquiring a video image in a live classroom, wherein the video image comprises at least one object; analyzing the video image to obtain a gesture image for controlling a camera; and determining whether to control the camera to track and shoot an execution object related to the gesture image based on the gesture image.

In some embodiments, analyzing the video image to obtain a gesture image for controlling a camera comprises: analyzing the video image to obtain a hand image of the at least one object; determining positions of bone key points and marks of bone key points of a hand based on the hand image; connecting the positions of bone key points corresponding to the marks of bone key points based on a marking rule of bone key points to obtain a hand bone image; and determining that the gesture image is presented as the gesture bone image in response to the hand bone image matching a gesture bone image, wherein the gesture bone image is preset.

In some embodiments, the gesture bone image comprises a first gesture bone image or a second gesture bone image; determining whether to control the camera to track and shoot an execution object related to the gesture image based on the gesture image comprises: determining to control the camera to perform a panoramic shooting based on specific panoramic parameters in response to the gesture image being represented as the first gesture bone image; determining to control the camera to track and shoot the execution object related to the gesture image in response to the gesture image being represented as the second gesture bone image.

In some embodiments, the method further comprises: acquiring current shooting parameters after determining to control the camera to track and shoot the execution object related to the gesture image; analyzing the video image to obtain a body image of the execution object related to the gesture image; obtaining shooting adjustment parameters for tracking the body image according to the video image and the body image on the basis of the current shooting parameters; adjusting the camera to track and shoot the execution object based on the shooting adjustment parameters.

In some embodiments, obtaining shooting adjustment parameters for tracking the body image according to the video image and the body image on the basis of the current shooting parameters comprises: acquiring a target core position of the execution object in the video image based on the body image of the execution object, where the target core position is a focus position of the camera for tracking and shooting; obtaining the shooting adjustment parameter for tracking the target core position according to the video image and the target core position on the basis of the current shooting parameters.

In some embodiments, obtaining shooting adjustment parameters for tracking the body image according to the video image and the body image on the basis of the current shooting parameters further comprises: acquiring a specific point position in the video image; obtaining the shooting adjustment parameters of the execution object according to the target core position and the specific point position on the basis of the current shooting parameters, wherein the shooting adjustment parameters enable the specific point position of the video image captured after adjustment to coincide with the target core position of the video image.

In some embodiments, the target core position comprises: a center position of a head image of the execution object, a geometric center position of the body image of the execution object, or a center point of the line connecting the two furthest points in the body image.

Some embodiments of the present disclose provide a follow-up shooting device, comprising: an acquiring unit configured to acquiring a video image in a live classroom, wherein the video image comprises at least one object; an analysis unit configured to analyze the video image to obtain a gesture image for controlling a camera; and a determining unit configured to determining whether to control the camera to track and shoot an execution object related to the gesture image based on the gesture image.

Some embodiments of the present disclose provide a computer-readable storage medium with a computer program stored thereon, wherein, when the program is executed by a processor, the method according to the above embodiments is implemented.

Some embodiments of the present disclose provide an electronic device, comprising: one or more processors; a storage device configured to store one or more programs, wherein when the one or more programs are executed by the one or more processors, the one or more processors implement the method according to the above embodiments.

Compared with the relative art, the above solutions of the embodiments of the present disclosure have at least the following beneficial effects:

The present disclosure provides a follow-up shooting method and device, a medium, and an electronic device. The method includes: acquiring a video image in a live classroom, wherein the video image comprises at least one object; analyzing the video image to obtain a gesture image for controlling a camera; determining whether to control the camera to track and shoot an execution object related to the gesture image based on the gesture image. The present disclosure determines whether to control the camera to track and shoot the execution object related to the gesture image by mean of the gesture image, avoiding the provision of a cameraman in the live teaching classroom, and reducing the teaching cost of the live teaching classroom.

DETAILED DESCRIPTION OF EMBODIMENTS

Figure 1:
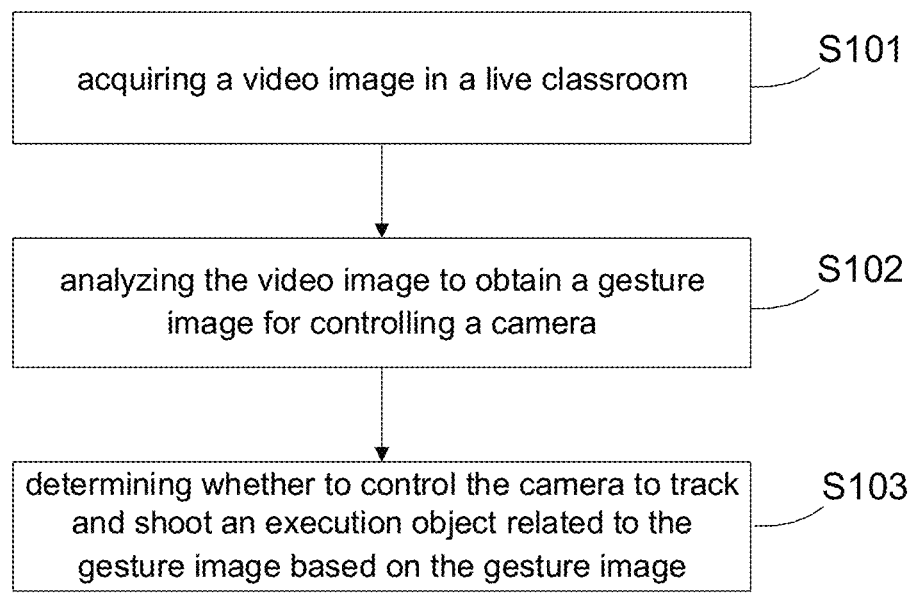
FIG. 1 shows a flowchart of a follow-up shooting method according to some embodiments of the present disclosure.

In order to make the objectives, technical solutions, advantages of the present disclosure clearer, the present disclosure will be further described in detail below with reference to the accompanying drawings. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

The terms used in the embodiments of the present disclosure are only for the purpose of describing specific embodiments, and are not intended to limit the present disclosure. The singular forms of "a", "said" and "the" used in the embodiments of the present disclosure and the appended claims are also intended to include plural forms, unless the context clearly indicates other meanings, "multiple" generally contains at least two types.

It should be understood that the term "and/or" used in this description is only an association relationship describing associated objects, indicating that there can be three types of relationships. For example, A and/or B can mean that there are three cases where A alone, A and B, and B alone. In addition, the character "/" in this text generally indicates that the associated objects before and after are in an "or" relationship.

It should be understood that although the terms first, second, third, etc. may be used to describe the embodiments of the present disclosure, these descriptions should not be limited to these terms. These terms are only used to distinguish the description. For example, without departing from the scope of the embodiments of the present disclosure, the first may also be referred to as the second, and similarly, the second may also be referred to as the first.

Depending on the context, the words "if" and "whether" as used herein can be interpreted as "when" or "as" or "in response to determination" or "in response to detection". Similarly, depending on the context, the phrase "if . . . determined" or "if (statement or event) detected" can be interpreted as "when determined" or "in response to determination" or "when detected (statement or event)" or "in response to detection (statement or event)".

It should also be noted that the terms "include", "comprise" or any other variants thereof are intended to cover non-exclusive inclusion, so that a commodity or device including a series of elements not only includes those elements, but also includes those elements that are not explicitly listed. Other elements of, or also include elements inherent to this commodity or device. If there are no more restrictions, the element defined by the sentence "includes a . . . " does not exclude the existence of another same element in the commodity or device that includes the element.

The optional embodiments of the present disclosure will be described in detail below with reference to the accompanying drawings.

The present disclosure provides some embodiments of a follow-up shooting method.

The embodiments of the present disclosure are applied to the following scenarios. In a live teaching classroom, a camera is used to broadcast the teaching content of the teacher in real time. If the teacher makes a first gesture, the camera will start tracking and shooting the teacher; if the teacher makes a second gesture, the camera will stop tracking and shooting the teacher, and take a panoramic view of the live teaching classroom.

The embodiments of the present disclosure will be described in detail below in conjunction with FIG. 1.

Step S101: acquiring a video image in a live classroom.

In a live classroom, a camera in front of the teacher is set to record the teaching process of the teacher through a video mode. The video is composed of frames of video images continuously collected. The embodiments of the present disclosure obtain specific gesture information of the teacher by analyzing the video images in the live classroom. The video image includes at least one object.

Step S102: analyzing the video image to obtain a gesture image for controlling a camera.

The gesture image is a part of the video image.

Step S103: determining whether to control the camera to track and shoot an execution object related to the gesture image based on the gesture image.

In the embodiment of the present disclosure, the object specifically refers to an image of a person in the video image. There may be multiple images of persons in the video image, that is, multiple objects. Therefore, the execution target may be understood as a person who makes the gesture information in the gesture image in the video image.

The embodiments of the present disclosure determine whether to control the camera to track and shoot the execution object related to the gesture image through the gesture image, avoiding the provision of a cameraman in the live teaching classroom, and reducing the teaching cost of the live teaching classroom.

Since the embodiments of the present disclosure are further optimized based on the above-mentioned embodiments, the explanation based on the same method and the meaning of the same name is the same as the above-mentioned embodiments, and will not be repeated here.

Figure 2A:
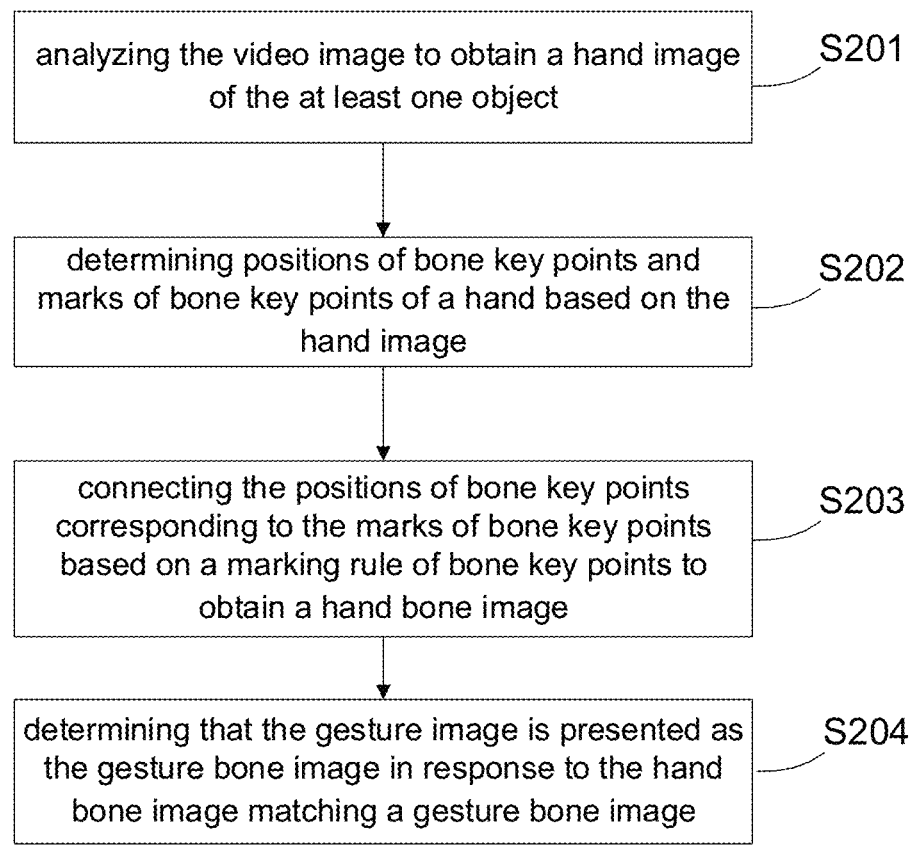
FIG. 2A shows a flowchart of a method for acquiring a gesture image according to some embodiments of the present disclosure.

As shown in FIG. 2A, analyzing the video image to obtain a gesture image for controlling a camera includes the following steps:

Step S201: analyzing the video image to obtain a hand image of the at least one object.

Step S202: determining positions of bone key points and marks of bone key points of a hand based on the hand image.

The bone key points are used to represent coordinate points of the morphological features of the bones in the hand image. For example, the connection points of bone joints, fingertip points of the fingers. The bone key points are used to build bone images and image matching.

Figure 2B:
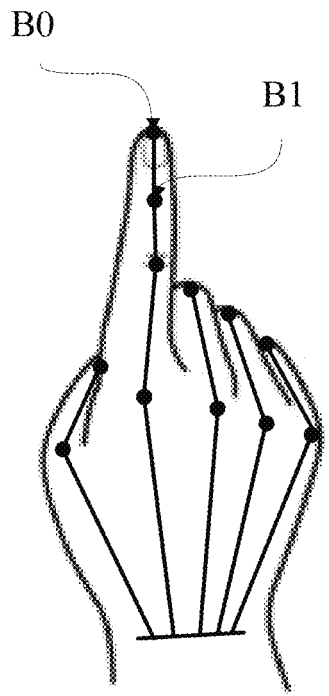
FIG. 2B shows a schematic diagram of a gesture bone image according to some embodiments of the present disclosure.

In video images, bone key points are represented in the forms of positions of bone key points and marks of bone key points. The positions of the bone key points are coordinate points of the bone key points in the video image. The marks of bone key points are used to indicate the positions of the bone key points in the bones. For example, as shown in FIG. 2B, the mark of bone key point of the first joint point of the index finger is marked as B1, and the mark of bone key point of the fingertip point of the index finger is marked as B0.

Step S203: connecting the positions of bone key points corresponding to the marks of bone key points based on a marking rule of bone key points to obtain a hand bone image.

The marking rules of bone key points stipulate connection relationships between bone key points, that is, connection relationships of bones in the real scene. For example, in actual bones, the first joint of the index finger and the fingertip of the index finger are connected by the same bone. Therefore, continuing the above example, the marking rules of bone key points stipulate that the mark B0 of bone key point is connected with the mark B1 of bone key point.

The hand bone image generated based on the marking rules of bone key points may reflect the current hand posture, that is, the gesture. The interference of ambient light on gesture recognition is avoided, and the accuracy of gesture recognition is improved.

Step S204, determining that the gesture image is presented as the gesture bone image in response to the hand bone image matching a gesture bone image.

Wherein, the gesture bone image is preset.

The process of determining that the hand bone image matches the gesture bone image is not described in detail in the embodiments, and it may be implemented with reference to various implementation manners in the relative art.

The gesture bone image includes a preset gesture bone image, and the gesture bone image indicates a specific gesture meaning. For example, in a live teaching classroom, the first gesture bone image is used to indicate to control the camera perform a panoramic shooting based on specific panoramic parameters; the second gesture bone image is used to indicate to control the camera to track and shoot the person who makes the gesture, such as the teacher.

Since the embodiments of the present disclosure are further optimized based on the above-mentioned embodiments, the explanation based on the same method and the meaning of the same name is the same as the above-mentioned embodiments, and will not be repeated here.

The gesture bone image includes a first gesture bone image or a second gesture bone image.

Figure 3:
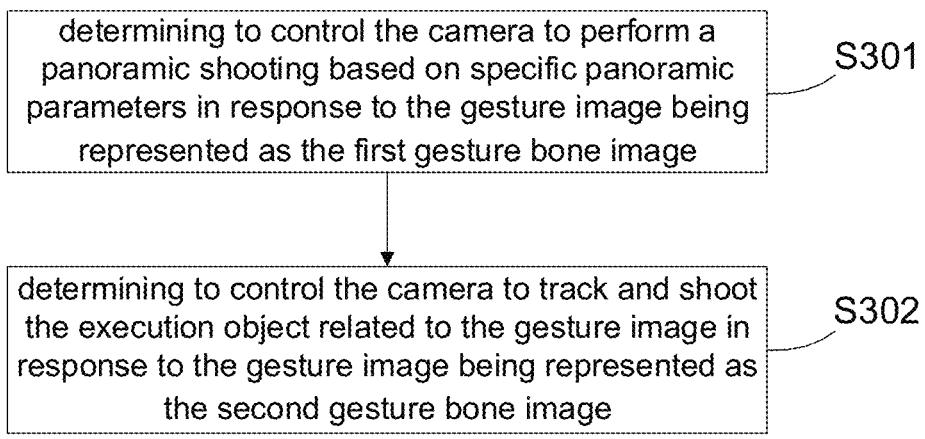
FIG. 3 shows a flowchart of a method for responding to a gesture image according to some embodiments of the present disclosure.

As shown in FIG. 3, determining whether to control the camera to track and shoot an execution object related to the gesture image based on the gesture image includes the following steps:

Step S301: determining to control the camera to perform a panoramic shooting based on specific panoramic parameters in response to the gesture image being represented as the first gesture bone image.

Step S302: determining to control the camera to track and shoot the execution object related to the gesture image in response to the gesture image being represented as the second gesture bone image.

The above two steps are only used to show two specific implementation steps. In specific applications, the two steps are in no particular order. For example, when the gesture image of the teacher is represented as the second gesture bone image, the camera will track and shoot the teacher; when the gesture image of the teacher is represented as the first gesture bone image, the camera will take a panoramic view of the live teaching classroom.

The embodiments of the present disclosure control the shooting of the camera through the gestures of persons in the live teaching classroom, thereby simplifying the control of the camera, saving labor costs, and improving the flexibility of the live broadcasting.

Since the embodiments of the present disclosure are further optimized based on the above-mentioned embodiments, the explanation based on the same method and the meaning of the same name is the same as the above-mentioned embodiments, and will not be repeated here.

In order to improve the accuracy of tracking execution objects, the embodiments of the present disclosure provide further specific steps.

Figure 4:
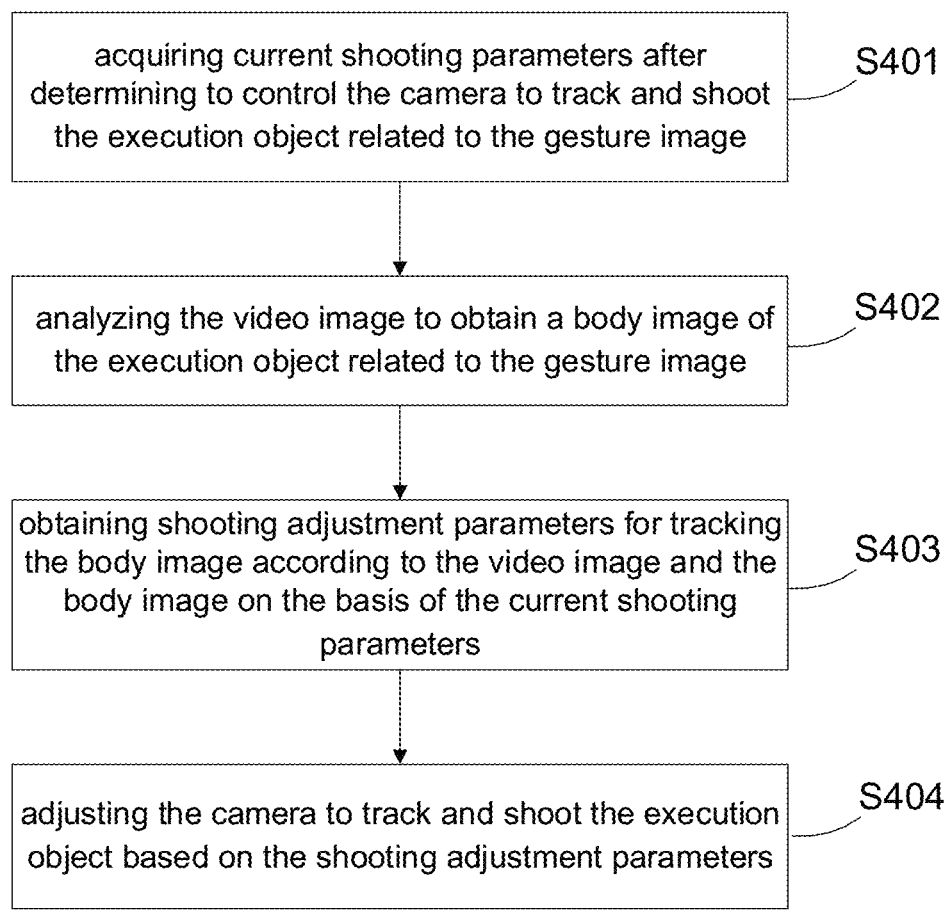
FIG. 4 shows a flowchart of another follow-up shooting method according to some embodiments of the present disclosure.

As shown in FIG. 4, the method further includes the following specific steps:

Step S401, acquiring current shooting parameters after determining to control the camera to track and shoot the execution object related to the gesture image.

The current shooting parameters refer to the shooting parameters used to control the camera when shooting the video image described in the foregoing embodiments.

Step S402: analyzing the video image to obtain a body image of the execution object related to the gesture image.

The execution object related to the gesture image may be understood as a person who makes a corresponding gesture. For example, the teacher who makes the corresponding gesture.

The body image of the execution object can be understood as an image surrounded by the outline of the execution object in the video image.

Step S403, obtaining shooting adjustment parameters for tracking the body image according to the video image and the body image on the basis of the current shooting parameters.

The shooting adjustment parameter is parameters adjusted on the basis of the current shooting parameters.

In the embodiments of the present disclosure, the body image of the execution object is used as a core of the shooting, and then the shooting adjustment parameters are generated. For example, shooting adjustment parameters include at least one of adjustment angle, focus and focal length.

Step S404: adjusting the camera to track and shoot the execution object based on the shooting adjustment parameters.

In the embodiments of the present disclosure, the body image of the execution object is used as the tracking target of the camera to ensure that the body image of the execution object is always in the video image.

Since the embodiments of the present disclosure are further optimized based on the above-mentioned embodiments, the explanation based on the same method and the meaning of the same name is the same as the above-mentioned embodiments, and will not be repeated here.

Figure 5A:
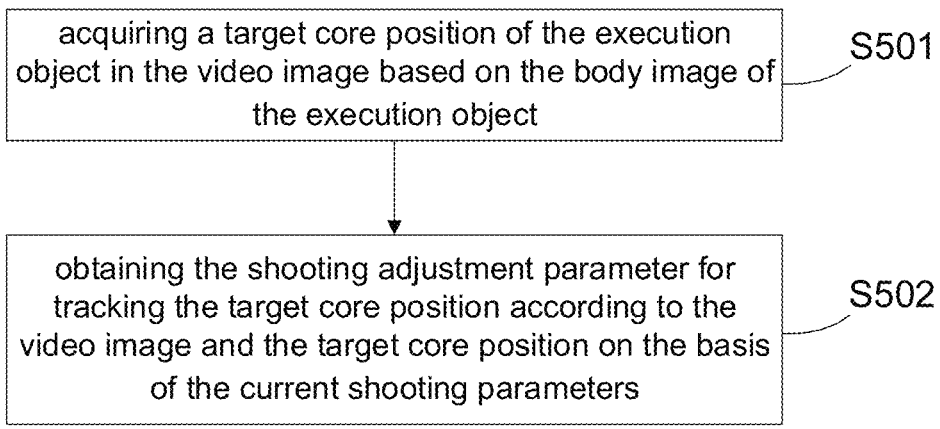
FIG. 5A shows a flowchart of a method for obtaining shooting adjustment parameters according to some embodiments of the present disclosure.

As shown in FIG. 5A obtaining shooting adjustment parameters for tracking the body image according to the video image and the body image on the basis of the current shooting parameters includes following steps:

Step S501: acquiring a target core position of the execution object in the video image based on the body image of the execution object.

The target core position is a focus position of the camera for tracking and shooting. It may be understood that the camera always tracks the target core position. The target core position includes: a center position of a head image of the execution object, a geometric center position of the body image of the execution object, or a center point of the line connecting the two furthest points in the body image of the execution object.

Figure 5B:
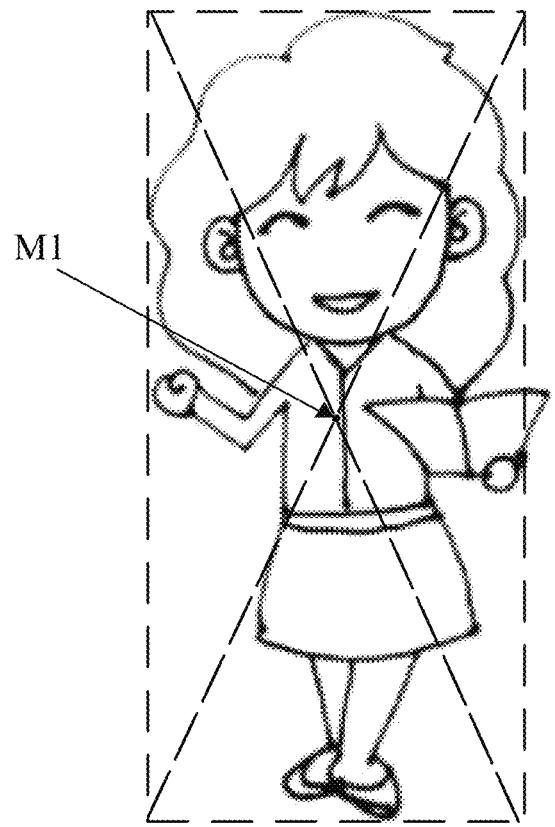
FIG. 5B shows a schematic diagram of a geometric center position of the body image of the execution object according to some embodiments of the present disclosure.
Figure 5C:
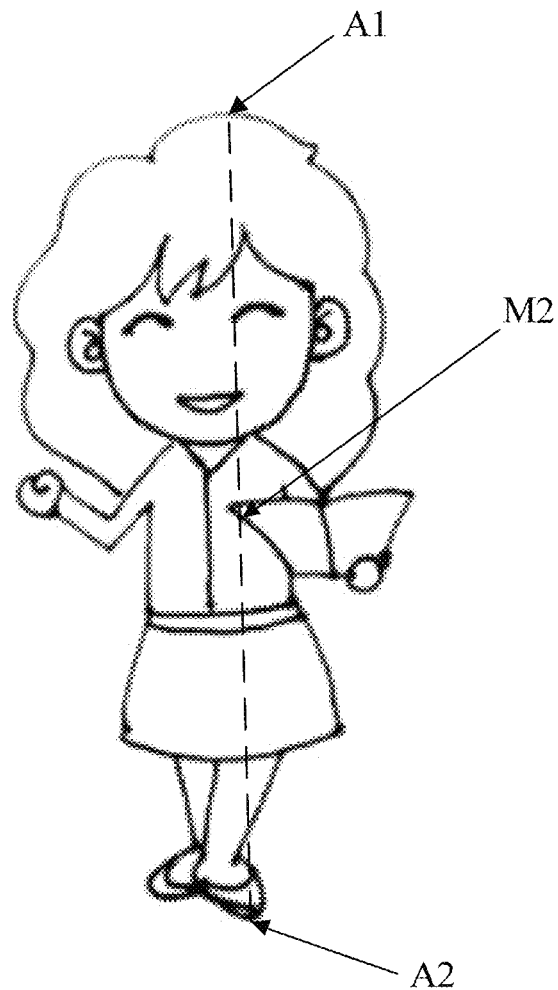
FIG. 5C shows a schematic diagram of a center point of a line connecting two points with the furthest distance in the body image of the execution object according to some embodiments of the present disclosure.

For example, as shown in FIG. 5B, the target core position is the geometric center position M1 of the body image of the execution object; as shown in FIG. 5C, the target core position is the center point M2 of the line connecting the two furthest points A1 and A2 in the body image of the execution object.

Step S502, obtaining the shooting adjustment parameter for tracking the target core position according to the video image and the target core position on the basis of the current shooting parameters.

For example, the adjustment angle in the shooting adjustment parameters is generated based on the target core position, and the target core position is taken as the focus, and the focal length which is from the camera to the target core position is generated.

In the embodiments of the present disclosure, the target core position of the execution object is used as the tracking target of the camera, which makes the tracking more clear and specific, and ensures that the target core position of the execution object is always in the video image.

Since the embodiments of the present disclosure are further optimized based on the above-mentioned embodiments, the explanation based on the same method and the meaning of the same name is the same as the above-mentioned embodiments, and will not be repeated here.

Figure 6:
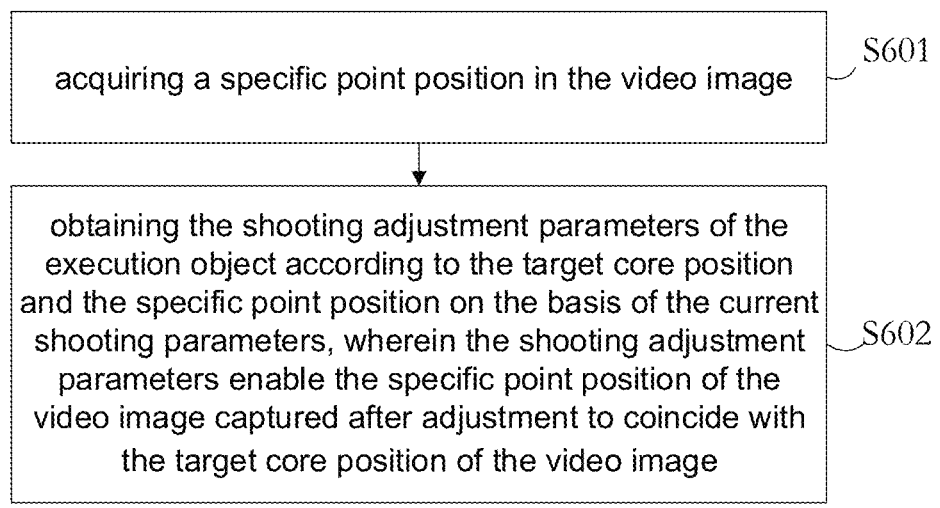
FIG. 6 shows a flowchart of another method for obtaining shooting adjustment parameters according to some embodiments of the present disclosure.

As shown in FIG. 6, obtaining shooting adjustment parameters for tracking the body image according to the video image and the body image on the basis of the current shooting parameters further includes the following steps:

Step S601: acquiring a specific point position in the video image.

In order to prevent the execution object from being marginalized in the video image, the embodiments of the present disclosure provide a specific point position, so that the target core position of the execution object in the video image is always near the specific point position.

The specific point position is, for example, a center of the video image, may be understood as the previous target core position of the execution object in the previous video image.

Step S602, obtaining the shooting adjustment parameters of the execution object according to the target core position and the specific point position on the basis of the current shooting parameters, wherein the shooting adjustment parameters enable the specific point position of the video image captured after adjustment to coincide with the target core position of the video image.

The video image refers to the current video image, which is the same as the video image described in the foregoing embodiments.

The target core position may be understood as the target core position of the execution object in the current video image.

In order to make the specific point position coincides with the current target core position, the shooting angle of the camera is adjusted by the shooting adjustment parameters, and then the focus and focal length are adjusted to make the image of the target core position in the video image clearer. For example, the target core position includes the center position of the head image of the execution object, and the camera always tracks the center position of the head image of the execution object, so that the center position of the head image is always in the center position of the video image, which may make students improve their concentration.

The embodiments of the present disclosure not only stipulates the target core position of the tracking execution object, but also make the target core position always be at the specific point position in the video image. The execution object is avoided from being marginalized in the video image, and the live broadcast effect of the teaching video is improved.

The present disclosure also provides some device embodiments according to the above embodiments, which are used to implement the method steps described in the above embodiments. the explanation based on the same method and the meaning of the same name is the same as the above-mentioned embodiments, and will not be repeated here.

Figure 7:
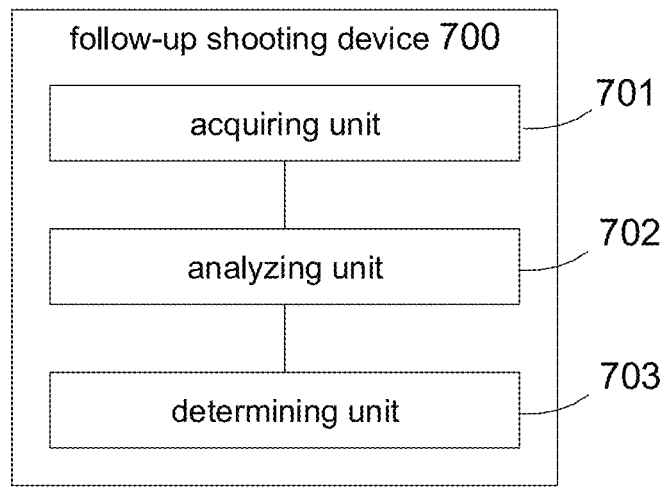
FIG. 7 shows a unit block diagram of a follow-up shooting device according to some embodiments of the present disclosure.

As shown in FIG. 7, the present disclosure provides a follow-up shooting device 700, including:

an acquiring unit 701 configured to acquiring a video image in a live classroom, wherein the video image comprises at least one object t;

an analyzing unit 702 configured to analyze the video image to obtain a gesture image for controlling a camera; and a determining unit 703 configured to determining whether to control the camera to track and shoot an execution object related to the gesture image based on the gesture image.

Optionally, the analysis unit 702 includes:

an image analysis subunit, configured to analyze the video image to obtain a hand image of the at least one object;

a key point determination subunit configured to determine positions of bone key points and marks of bone key points of a hand based on the hand image;

a bone obtaining subunit configured to connect the positions of bone key points corresponding to the marks of bone key points based on a marking rule of bone key points to obtain a hand bone image; and a gesture determination subunit configured to determine that the gesture image is presented as the gesture bone image in response to the hand bone image matching a gesture bone image, wherein the gesture bone image is preset.

Optionally, the gesture bone image includes a first gesture bone image or a second gesture bone image;

The determining unit 703 includes:

a panoramic response subunit configured to determine to control the camera to perform a panoramic shooting based on specific panoramic parameters in response to the gesture image being represented as the first gesture bone image; and a tracking response subunit configured to determine to control the camera to track and shoot the execution object related to the gesture image in response to the gesture image being represented as the second gesture bone image.

Optionally, the device further includes:

a basic acquiring unit configured to acquiring current shooting parameters after determining to control the camera to track and shoot the execution object related to the gesture image;

a body image acquiring unit configured to the video image to obtain a body image of the execution object related to the gesture image;

a parameter obtaining unit configured to shooting adjustment parameters for tracking the body image according to the video image and the body image on the basis of the current shooting parameters; and a tracking unit configured to adjusting the camera to track and shoot the execution object based on the shooting adjustment parameters.

Optionally, the parameter obtaining unit includes:

a position acquiring subunit, configured to acquire a target core position of the execution object in the video image based on the body image of the execution object, where the target core position is a focus position of the camera for tracking and shooting; and an adjusting subunit, configured to obtain the shooting adjustment parameter for tracking the target core position according to the video image and the target core position on the basis of the current shooting parameters.

Optionally, the adjusting subunit includes:

a specific point acquiring subunit configured to acquire a specific point position in the video image;

a coincidence subunit configured to obtain the shooting adjustment parameters of the execution object according to the target core position and the specific point position on the basis of the current shooting parameters, wherein the shooting adjustment parameters enable the specific point position of the video image captured after adjustment to coincide with the target core position of the video image.

Optionally, the target core position includes: a center position of a head image of the execution object, a geometric center position of the body image of the execution object, or a center point of the line connecting the two furthest points in the body image.

The embodiment of the present disclosure determines whether to control the camera to track and shoot the execution object related to the gesture image by mean of the gesture image, avoiding the provision of a cameraman in the live teaching classroom, and reducing the teaching cost of the live teaching classroom.

Figure 8:
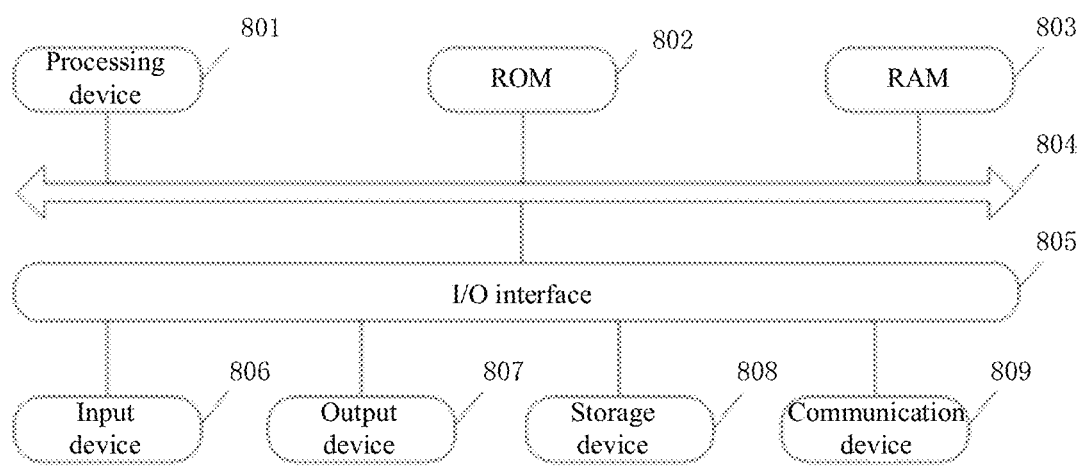
FIG. 8 shows a schematic diagram of an electronic device according to some embodiments of the present disclosure.

As shown in FIG. 8, some embodiments provide an electronic device. The electronic device includes: at least one processor; and a storage device communicatively connected with the at least one processor. The storage device stores instructions that can be executed by the at least one processor, and the instructions are executed by the at least one processor, so that the at least one processor may implement the method steps described in the above embodiments.

Some embodiments of the present disclosure provide a non-volatile computer storage medium, the computer storage medium stores computer-executable instructions, and the computer-executable instructions maybe executed, so as to implement the method steps described in the above embodiments.

Referring to FIG. 8, which shows a schematic structural diagram of an electronic device suitable for implementing the embodiments of the present disclosure. The terminal devices in the embodiments of the present disclosure may include, but are not limited to, mobile phones, notebook computers, digital broadcast receivers, PDAs (personal digital assistants), PADs (tablet computers), PMPs (portable multimedia players), vehicle-mounted terminals (for example, Car navigation terminals) and other mobile terminals and fixed terminals such as digital TVs, desktop computers, etc. The electronic device shown in FIG. 8 is only an example, and should not bring any limitation to the function and scope of use of the embodiments of the present disclosure.

As shown in FIG. 8, the electronic device may include a processing device (such as a central processing unit, a graphics processor, etc.) 801, which can be loaded into a random access memory according to a program stored in a read-only memory (ROM) 802 or from a storage device 808 (RAM) The program in 803 executes various appropriate actions and processing. In the RAM 803, various programs and data required for the operation of the electronic device are also stored. The processing device 801, the ROM 802, and the RAM 803 are connected to each other through a bus 804. An input/output (I/O) interface 805 is also connected to the bus 804.

Generally, the following devices can be connected to the I/O interface 805: including input devices 806 such as touch screen, touch pad, keyboard, mouse, camera, microphone, accelerometer, gyroscope, etc.; including, for example, liquid crystal display (LCD), speakers, vibration An output device 807 such as a device; a storage device 808 such as a magnetic tape, a hard disk, etc.; and a communication device 809. The communication device 809 may allow the electronic device to perform wireless or wired communication with other devices to exchange data. Although FIG. 8 shows an electronic device having various devices, it should be understood that it is not required to implement or have all of the illustrated devices. It may alternatively be implemented or provided with more or fewer devices.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication device 809, or installed from the storage device 808, or installed from the ROM 802. When the computer program is executed by the processing device 801, the above-mentioned functions defined in the method of the embodiment of the present disclosure are executed.

It should be noted that the aforementioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic device; or it may exist alone without being assembled into the electronic device.

The computer program code used to perform the operations of the present disclosure can be written in one or more programming languages or a combination thereof. The above-mentioned programming languages include object-oriented programming languages—such as Java, Smalltalk, C++, and also conventional Procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logical function Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations Or it can be realized by a combination of dedicated hardware and computer instructions.

The units described in the embodiments of the present disclosure may be implemented in a software manner, or may be implemented in a hardware manner. Among them, the name of the unit does not constitute a limitation on the unit itself under certain circumstances.

What is claimed is:

1. A follow-up shooting method comprising:
   acquiring a video image in a live classroom, wherein the video image comprises at least one object;
   analyzing the video image to obtain a gesture image for controlling a camera; and
   determining whether to control the camera to track and shoot an execution object related to the gesture image based on the gesture image,
   wherein analyzing the video image to obtain a gesture image for controlling a camera comprises:
   analyzing the video image to obtain a hand image of the at least one object;
   determining positions of bone key points and marks of bone key points of a hand based on the hand image;
   connecting the positions of bone key points corresponding to the marks of bone key points based on a marking rule of bone key points to obtain a hand bone image; and
   determining that the gesture image is presented as the gesture bone image in response to the hand bone image matching a gesture bone image, wherein the gesture bone image is preset.

2. The method according to claim 1, wherein,
   the gesture bone image comprises a first gesture bone image or a second gesture bone image;
   determining whether to control the camera to track and shoot an execution object related to the gesture image based on the gesture image comprises:
   determining to control the camera to perform a panoramic shooting based on specific panoramic parameters in response to the gesture image being represented as the first gesture bone image;
   determining to control the camera to track and shoot the execution object related to the gesture image in response to the gesture image being represented as the second gesture bone image.

3. The method according to claim 2, wherein the method further comprises:
   acquiring current shooting parameters after determining to control the camera to track and shoot the execution object related to the gesture image;
   analyzing the video image to obtain a body image of the execution object related to the gesture image;
   obtaining shooting adjustment parameters for tracking the body image according to the video image and the body image on the basis of the current shooting parameters;
   adjusting the camera to track and shoot the execution object based on the shooting adjustment parameters.

4. The method according to claim 3, wherein obtaining shooting adjustment parameters for tracking the body image according to the video image and the body image on the basis of the current shooting parameters comprises:
   acquiring a target core position of the execution object in the video image based on the body image of the execution object, where the target core position is a focus position of the camera for tracking and shooting;

obtaining the shooting adjustment parameter for tracking the target core position according to the video image and the target core position on the basis of the current shooting parameters.

5. The method according to claim 4, wherein obtaining shooting adjustment parameters for tracking the body image according to the video image and the body image on the basis of the current shooting parameters further comprises:

acquiring a specific point position in the video image;

obtaining the shooting adjustment parameters of the execution object according to the target core position and the specific point position on the basis of the current shooting parameters, wherein the shooting adjustment parameters enable the specific point position of the video image captured after adjustment to coincide with the target core position of the video image.

6. The method according to claim 4, wherein the target core position comprises: a center position of a head image of the execution object, a geometric center position of the body image of the execution object, or a center point of the line connecting the two furthest points in the body image.

7. A non-transitory computer-readable storage medium with a computer program stored thereon, wherein, when the program is executed by a processor, the method according to claim 1 is implemented.

8. An electronic device, comprising:

one or more processors;

a storage to store one or more programs, wherein when the one or more programs are executed by the one or more processors, the one or more processors implement the method according to claim 1.

9. A follow-up shooting device, comprising:

an acquirer to acquiring a video image in a live classroom, wherein the video image comprises at least one object;

an analyzer to analyze the video image to obtain a gesture image for controlling a camera; and a determiner to determining whether to control the camera to track and shoot an execution object related to the gesture image based on the gesture image, wherein the analyzer analyzes the video image to obtain a hand image of the at least one object; determines positions of bone key points and marks of bone key points of a hand based on the hand image; connects the positions of bone key points corresponding to the marks of bone key points based on a marking rule of bone key points to obtain a hand bone image; and determines that the gesture image is presented as the gesture bone image in response to the hand bone image matching a gesture bone image, wherein the gesture bone image is preset.

* * * * *